(12) United States Patent  (10) Patent No.: US 8,488,632 B2
Smelyansky  (45) Date of Patent: Jul. 16, 2013

(54) OPTIMIZING VOIP FOR SATELLITE CONNECTION

(75) Inventor: Vladimir Smelyansky, Glenview, IL (US)

(73) Assignee: XCAST LABS, Inc., Northfield, IL (US)

( * ) Notice: Subject to any disclaimer, the term of this patent is extended or adjusted under 35 U.S.C. 154(b) by 327 days.

(21) Appl. No.: 12/719,664

(22) Filed: Mar. 8, 2010

(65) Prior Publication Data

US 2010/0232349 A1    Sep. 16, 2010

Related U.S. Application Data

(60) Provisional application No. 61/159,152, filed on Mar. 11, 2009.

(51) Int. Cl.
*H04J 3/18* (2006.01)

(52) U.S. Cl.
USPC ............................ 370/477; 370/352; 709/233

(58) Field of Classification Search
USPC .................. 370/477, 352; 709/233
See application file for complete search history.

(56) References Cited

U.S. PATENT DOCUMENTS

| 7,958,242 B2* | 6/2011 | Rey .............................. 709/227 |
| 2001/0023454 A1* | 9/2001 | Fitzgerald ..................... 709/233 |
| 2005/0094628 A1* | 5/2005 | Ngamwongwattana et al. ............................ 370/352 |
| 2007/0036142 A1* | 2/2007 | Veschi et al. .................. 370/352 |

OTHER PUBLICATIONS

International Search Report issued in PCT/US2010/026696 dated May 7, 2010.

* cited by examiner

*Primary Examiner* — Wei Zhao
(74) *Attorney, Agent, or Firm* — Smith, Gambrell & Russell, LLP

(57) ABSTRACT

A method and system for reducing the total bandwidth and number of packets utilized to transmit a voice transmission over a satellite connection is provided. RTP allows packets to store different sizes of an audio signal, including 40 and 60 millisecond. By increasing the amount of an audio signal that is stored in packets from 20 ms to 60 ms, the actual network bandwidth utilized by a compression algorithm, such as G.729, is decreased from over 25 Kbits to fewer than 17 Kbits and the amount of packets utilized to transmit the audio signal is reduced.

16 Claims, 3 Drawing Sheets

OPTIMIZING VOIP FOR SATELLITE CONNECTION

CROSS-REFERENCE TO RELATED APPLICATIONS

This application claims the benefit of Provisional Application No. 61/159,152 filed Mar. 11, 2009, the contents of which are incorporated herein in their entirety.

BACKGROUND OF THE INVENTION

1. Field of the Invention

The present invention relates to a method and system for optimizing VoIP for satellite connection. More particularly, the present invention relates to a method and system for reducing the total bandwidth and number of packets utilized to transmit a voice transmission over a satellite connection.

2. Description of the Related Art

Voice over Internet Protocol (VoIP) telephony is a technology taking the world by storm. VoIP allows people to use their computer's Internet connection as a telephone, resulting in huge savings on both local and long distance calling. VoIP telephony sends voice transmissions over the Internet as a data packet, which is organized and decoded by VoIP software. Most people who receive a VoIP call over their standard telephone line never even realize that they are connected with a VoIP user. With satellite VoIP you are allowed to use the Internet as a telephone no matter where you are. VoIP over satellite works just like the telephone you have in your home today. You pick up the phone, dial the number and it connects you to whom you're calling through your high-speed satellite internet connection. Satellite VoIP telephony is perhaps the last frontier in VoIP development. Satellite Internet is becoming more and more popular among customers living in remote areas where telephone or cable service has not yet become available, such as drilling station, ships, scientific expeditions, and the like.

The use of satellite Internet service has been limited due to its high cost and technological limitations that include the amount of available bandwidth, which can be as small as 20 kbps, and the amount of packets that can be transmitted per second. Techniques for compressing audio transmissions have been developed to reduce the amount of network traffic used for satellite Internet service. One popular digital audio compression algorithm is G.729. However, the G.729 digital audio compression algorithm is not royalty free. The Internet Low Bit-rate Codec ("iLBC") audio compression algorithm, on the other hand, is royalty free and gaining some momentum.

Typically, for digital voice/audio transmission, an actual audio signal is divided into smaller packets that are transmitted independently. In VoIP telephony, this division of an audio signal into smaller Real-time Transport Protocol (hereinafter "RTP") packets is called packetization (hereinafter "ptime"). Currently, the common packet size stores 20 milliseconds of a digital voice/audio transmission. However, the use of this ptime generally provides a network bandwidth of 25 kbps and requires the transmission of more packets than is necessary for an audio signal.

One existing solution used to increase bandwidth and reduce the number of packets necessary to transmit an audio signal is a system where the VoIP service provider connects its media gateway located on the service provider's premises to the PSTN network using a Primary Rate Interface (hereinafter "PRI"). However, this solution suffers from the drawback that the service provider has to maintain the PRI, which results in added expense for lines and equipment maintenance. In addition, connectivity over PRIs does not provide the most effective and cost efficient way to terminate and originate calls. For example, in the case of call termination there is added cost. While, in the case of call origination, where customers are provided with inbound phone numbers, a low capacity network is required to be built with extremely wide presence in different areas.

Another solution is based on existing VoIP practice, where VoIP service providers utilize different PSTN carriers to originate and terminate call traffic in the most optimal way. However, this solution suffers from the drawback that termination and origination carriers cannot properly handle VoIP traffic with a ptime that is not 20 ms. Moreover, in the case of the G.729 compression algorithm, the use of a ptime that is not 20 ms is non-compliant with existing high capacity switches produced by companies such as Sonus, Lucent and others. In the case of iLBC it happens not to be supported at all. There is a need to decrease the actual bandwidth used during satellite VoIP. There is also a need to reduce the number of packet necessary to transmit an audio signal.

SUMMARY OF THE INVENTION

A method and system for reducing the total bandwidth and number of packets utilized to transmit a voice transmission over a satellite connection is provided. RTP allows packets to store more than 20 ms of an audio signal. For example, RTP packets can store 40 ms or 60 ms of an audio signal. By increasing the amount of an audio signal that is stored in packets from 20 ms to 60 ms, the actual network bandwidth utilized by a compression algorithm, such as G.729, is decreased from over 25 Kbits to fewer than 17 Kbits and the amount of packets utilized to transmit the audio signal is reduced.

According to an embodiment of the present invention, a computer-implemented method of reducing the total bandwidth and number of packets utilized to transmit a voice transmission over a satellite connection from a PSTN to a remote user device includes converting conventional RTP packets into optimized RTP packets having a ptime greater than 20 ms, transmitting the optimized RTP packets to the remote user device over a satellite connection, and receiving the optimized RTP packets at the remote user device. The ptime greater than 20 ms can be 40, 60, etc.

According to an embodiment of the present invention, the method also includes receiving an audio signal from a PSTN.

According to an embodiment of the present invention, the method also include packetizing the audio signal into the conventional RTP packets having a ptime of 20 ms. The audio signal can packetized into conventional RTP packets using the G.729 digital audio compression algorithm, the iLBC audio compression algorithm or any audio compression algorithm.

According to an embodiment of the present invention, a computer-implemented method of reducing the total bandwidth and number of packets utilized to transmit a voice transmission over a satellite connection from a remote user device to a PSTN includes receiving optimized RTP packets having a ptime of greater than 20 ms over a satellite connection from the remote user device, transmitting the optimized RTP packets to a media converter, and converting the optimized RTP packets into conventional RTP packets having a ptime of 20 ms. The ptime greater than 20 ms can be 40, 60, etc.

According to an embodiment of the present invention, the method also includes converting the conventional RTP packets having a ptime of 20 ms to an audio signal.

According to an embodiment of the present invention, the method also includes providing the audio signal to a PSTN.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A method and system for reducing the total bandwidth and number of packets utilized to transmit a voice transmission over a satellite connection is provided. RTP allows packets to store different sizes of an audio signal, including 40 and 60 millisecond. By increasing the amount of an audio signal that is stored in packets from 20 ms to 60 ms, the actual network bandwidth utilized by a compression algorithm, such as G.729, is decreased from over 25 Kbits to fewer than 17 Kbits and the amount of packets utilized to transmit the audio signal is reduced.

Figure 1:
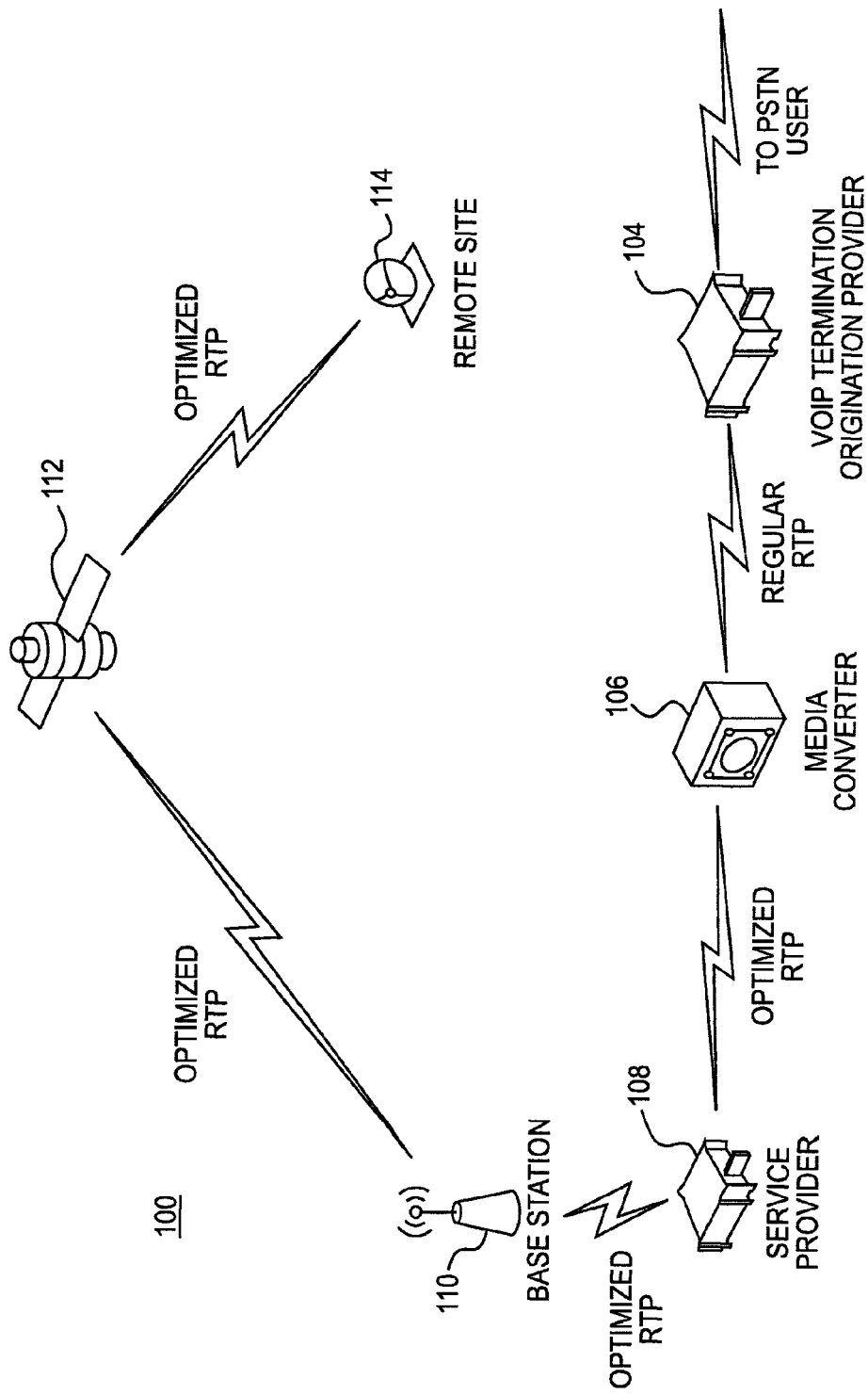
FIG. 1 is an exemplary diagram of block diagram of a network system in which the present invention may be implemented according to an embodiment of the invention.

As an example, such features may be provided in a network system 100 such as that shown in FIG. 1. Network system 100 includes a network (not shown), a VoIP Termination/Origination Provider 104, a Media Converter 106, VoIP service Provider 108, a base station 110, a satellite 112, and a remote user device 114. Network includes any communications network that is now in service or which may be developed in the future. Such a network may include one or more public or private communications networks, such as the Internet, wired or wireless telephone networks, wired or wireless data networks, local area networks, etc. VoIP Termination/Origination Provider 104 provides services for originating a VoIP call initiated from a PSTN and terminating a call initiated as a VoIP call at the PSTN. VoIP Termination/Origination Provider 104 also receives an audio signal and divides the audio signal into conventional RTP packets having a ptime of 20 ms. In an embodiment of the present invention, the G.729 digital audio compression algorithm is used to packetize the audio signal into the conventional RTP packets. In an embodiment of the present invention, the iLBC audio compression algorithm is used to packetize the audio signal into the conventional RTP packets.

VoIP Termination/Origination Provider 104 also provides a Media Converter 106 that receives the conventional RTP packets and converts the conventional RTP packets to optimized RTP packets having a ptime greater than 20 ms, and transmits the optimized RTP packets to Service Provider 108. In an embodiment of the present invention, the ptime is 40 ms. In an embodiment of the present invention, the ptime is 60 ms. Media Converter 106 also receives optimized RTP packets from the Service Provider 108, and converts the optimized RTP packets to conventional RTP packets having a ptime of 20 ms for transmission to the PSTN.

Service Provider 108 is a provider of VoIP over a satellite connection. Service Provider 108 receives the optimized RTP packets from VoIP Termination/Origination Provider 104 and forwards the optimized RTP packets to remote user device 114 through base station 110 and satellite 112. Service Provider 108 also receives the optimized RTP packets from the remote user device 114 through base station 110 and satellite 112. Remote user device 114 can be any type of device that receives/transmits the optimized RTP packets. Remote user devices 114 may include personal computers, Web-enabled televisions, mobile telephones and PDAs, and the like. In an embodiment of the present invention, the Media Converter may be provided at the base station 110 to reduce latency. One having ordinary skill in the art would recognize that the provider of VoIP over a satellite connection services and VoIP Termination/Origination services can be the same provider.

Figure 2A:
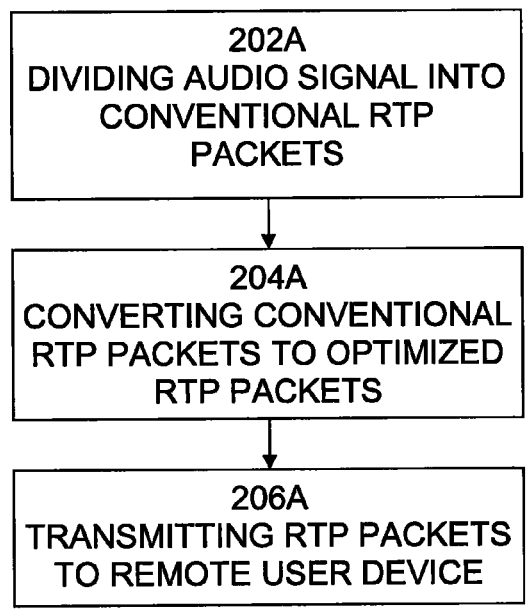
FIGS. 2A-2B are exemplary flow diagrams of a process of reducing the total bandwidth and number of packets utilized to transmit a voice transmission over a satellite connection according to an embodiment of the invention.

An exemplary flow diagram of a process 200A of reducing the total bandwidth and number of packets utilized to transmit a voice transmission over a satellite connection from a PSTN to a remote user device is shown in FIG. 2A. Process 200A begins with step 202A, in which an audio signal originating from a PSTN is divided into packets having a ptime of 20 ms. In step 204A, Media Converter 106 receives the conventional RTP packets and converts the conventional RTP packets into optimized RTP packets having a ptime that is greater than 20 ms. In an embodiment of the present invention, the ptime of the optimized RTP packets is 40 ms. In an embodiment of the present invention, the ptime of the optimized RTP packets is 60 ms. In step 206A, the Media Converter 106 transmits the optimized RTP packets to a provider of VoIP over a satellite connection services. The provider forwards the optimized RTP packets to a base station, which forwards the optimized RTP packets to a remote user device through a satellite.

Figure 2B:
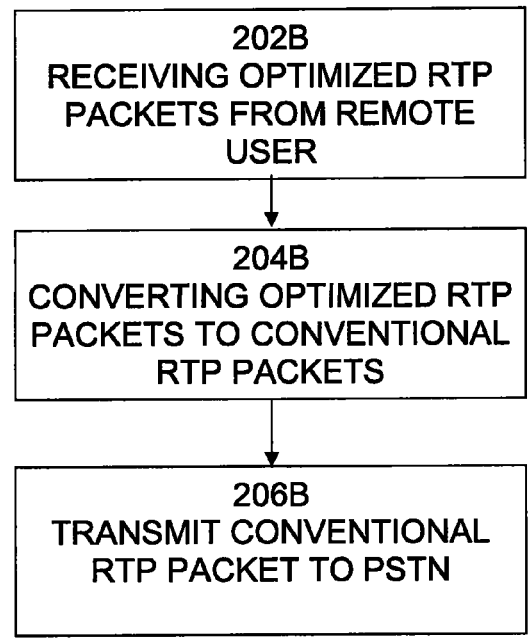

An exemplary flow diagram of a process 200B of reducing the total bandwidth and number of packets utilized to transmit a voice transmission over a satellite connection from a remote user device to a PSTN is shown in FIG. 2B. Process 200B begins with step 202B, in which optimized RTP packets that have a ptime of greater than 20 ms are received at a provider of VoIP over a satellite connection services from a remote user device through a satellite and base station. In an embodiment of the present invention, the ptime of the optimized RTP packets is 40 ms. In an embodiment of the present invention, the ptime of the optimized RTP packets is 60 ms. In step 204B, Media Converter 106 receives the optimized RTP packets from the provider and converts the optimized RTP packets into conventional RTP packets having a ptime of 20 ms. In step 206B, the Media Converter 106 transmits the conventional RTP packets to a VoIP Termination/Origination Provider for transmission on a PSTN.

Figure 3:
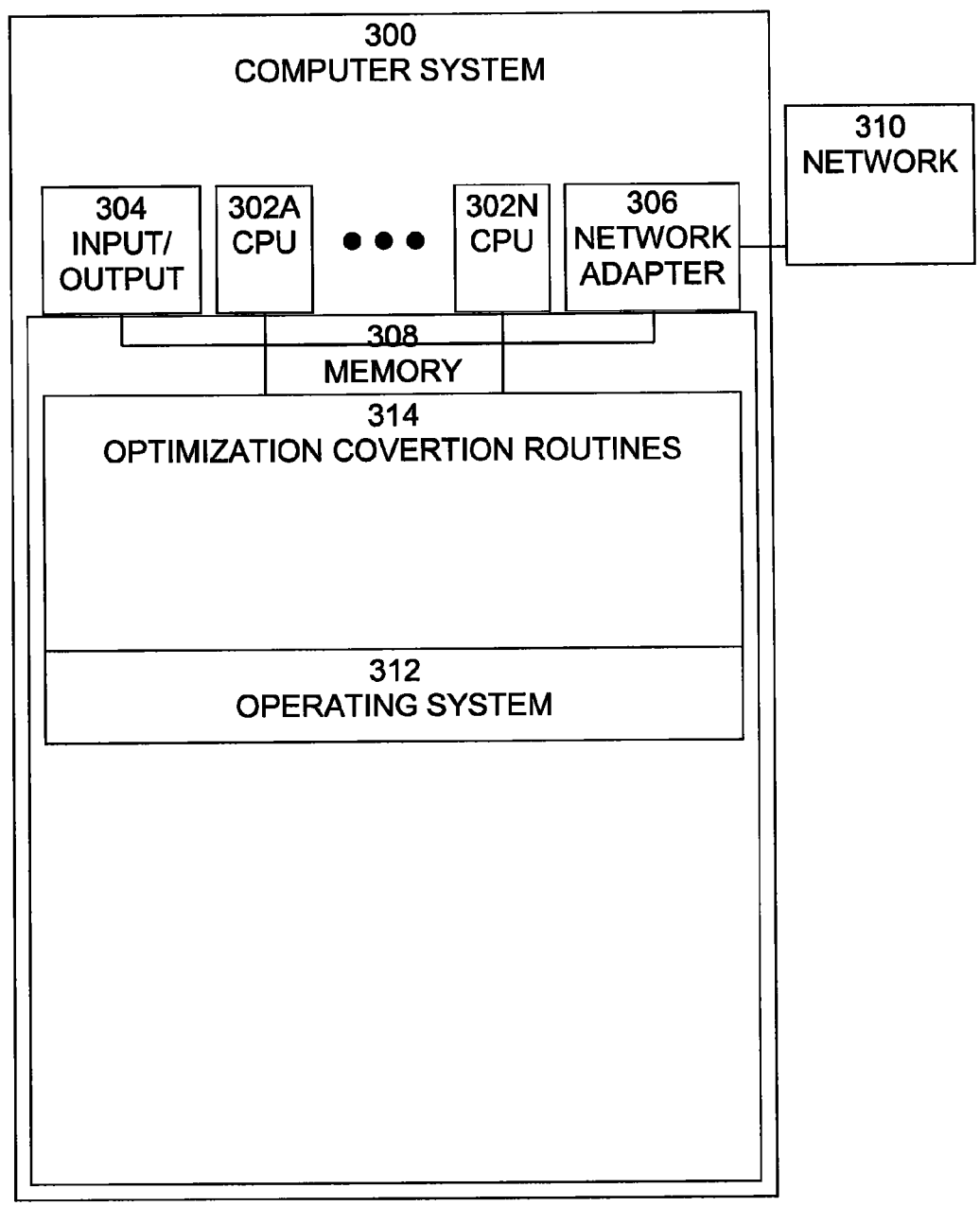
FIG. 3 is an exemplary block diagram of a computer system, such as a media converter, according to an embodiment of the invention.

An exemplary block diagram of a computer system 300, such as Medial Converter 106 is shown in FIG. 1. System 300 is typically a programmed general-purpose computer system, such as a personal computer, workstation, server system, minicomputer or mainframe computer. System 300 includes one or more processors (CPUs) 302A-302N, input/output circuitry 304, network adapter 306, and memory 308. CPUs 302A-302N execute program instructions in order to carry out the functions of converting conventional RTP packets to optimized RTP packets and optimized RTP packets to conventional RTP packets. Typically, CPUs 302A-302N are one or more microprocessors, such as an INTEL PENTIUM® processor. FIG. 3 illustrates an embodiment in which System 300 is implemented as a single multi-processor computer system, in which multiple processors 302A-302N share system resources, such as memory 308, input/output circuitry 304, and network adapter 306. However, the present invention also contemplates embodiments in which system 300 is implemented as a plurality of networked computer systems, which may be single-processor computer systems, multi-processor computer systems, or a mix thereof.

Input/output circuitry 304 provides the capability to input data to, or output data from, database/system 300. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces device 300 with network 310. Network 310 includes any communications network that is now in service or which may be developed in the future. Such a network may include one or more public or private communications networks, such as the Internet, wired or wireless telephone networks, wired or wireless data networks, local area networks, etc.

Memory 308 stores program instructions that are executed by, and data that are used and processed by, CPU 302 to perform the functions of system 300. Memory 308 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface, or Serial AT Attachment (SATA), or a variation or enhancement thereof.

The content of memory 308 varies depending upon the function that system 300 is programmed to perform. Operating system 312 provides overall system functionality. Routine 314 perform the functions necessary to provide the services of system 300.

As shown in FIG. 3, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable storage media include, floppy disks, hard disk drives, CD-ROMs, DVDROMs, RAM, flash memory, etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of reducing the total bandwidth and number of packets utilized to transmit a voice transmission over a satellite connection from a PSTN to a remote user device comprising:
converting conventional RTP packets into optimized RTP packets having a ptime greater than 20 ms;
transmitting the optimized RTP packets to the remote user device over a satellite connection; and
receiving the optimized RTP packets at the remote user device; wherein the amount of audio signal that is stored in a conventional RTP packet is less than the amount of audio signal that is stored in an optimized RTP packet.

2. The method according to claim 1, further comprising:
receiving an audio signal from a PSTN.

3. The method according to claim 2, further comprising:
packetizing the audio signal into the conventional RTP packets having a ptime of 20 ms.

4. The method according to claim 1, wherein the ptime of the optimized RTP packets is 40 ms.

5. The method according to claim 1, wherein the ptime of the optimized RTP packets is 60 ms.

6. The method according to claim 3, wherein the audio signal is packetized into the conventional RTP packets using a G.729 digital audio compression algorithm.

7. The method according to claim 3, wherein the audio signal is packetized into the conventional RTP packets using a Internet Low Bit-rate Codec audio compression algorithm.

8. The method according to claim 3, wherein the audio signal is packetized into the conventional RTP packets using an audio compression algorithm.

9. A computer-implemented method of reducing the total bandwidth and number of packets utilized to transmit a voice transmission over a satellite connection from a remote user device to a PSTN comprising:
receiving optimized RTP packets having a ptime of greater than 20 ms over a satellite connection from the remote user device;
transmitting the optimized RTP packets to a media converter; and
converting the optimized RTP packets into conventional RTP packets having a ptime of 20 ms; wherein the amount of audio signal that is stored in a conventional RTP packet is less than the amount of audio signal that is stored in an optimized RTP packet.

10. The method according to claim 9, further comprising: converting the conventional RTP packets having a ptime of 20 ms to an audio signal.

11. The method according to claim 10, further comprising: providing the audio signal to a PSTN.

12. The method according to claim 9, wherein the ptime of the optimized RTP packets is 40 ms.

13. The method according to claim 9, wherein the ptime of the optimized RTP packets is 60 ms.

14. The method according to claim 10, wherein the audio signal is packetized into the conventional RTP packets using a G.729 digital audio compression algorithm.

15. The method according to claim 10, wherein the audio signal is packetized into the conventional RTP packets using a Internet Low Bit-rate Codec audio compression algorithm.

16. The method according to claim 10, wherein the audio signal is packetized into the conventional RTP packets using an audio compression algorithm.

* * * * *